United States Patent
Herold et al.

(10) Patent No.: US 9,206,751 B2
(45) Date of Patent: *Dec. 8, 2015

(54) AIR HANDLING CONTROL FOR OPPOSED-PISTON ENGINES WITH UNIFLOW SCAVENGING

(71) Applicant: ACHATES POWER, INC., San Diego, CA (US)

(72) Inventors: Randy E. Herold, San Diego, CA (US); Nishit Nagar, San Diego, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/926,360

(22) Filed: Jun. 25, 2013

(65) Prior Publication Data

US 2014/0373814 A1    Dec. 25, 2014

(51) Int. Cl.
*F02B 25/08* (2006.01)
*F02D 41/00* (2006.01)
(Continued)

(52) U.S. Cl.
CPC ............ *F02D 41/0007* (2013.01); *F02B 25/08* (2013.01); *F02B 75/28* (2013.01); *F02D 41/0052* (2013.01); *F02D 41/0062* (2013.01); *F02D 41/0072* (2013.01); *F02D 41/1458* (2013.01); *F02D 2041/0067* (2013.01); *F02D 2200/0402* (2013.01); *F02D 2200/0411* (2013.01); *F02D 2400/04* (2013.01)

(58) Field of Classification Search
CPC .......... F02B 75/28; F02B 25/06; F02B 25/08; F01B 25/02; F02M 25/072; F02M 2025/0762; F02D 41/007; F02D 41/0062; F02D 41/0072; F02D 41/1458; F02D 41/0052; F02D 2200/0402; F02D 2041/0067; F02D 2400/04
USPC .... 123/51 B, 51 BA, 51 BD, 568.11–568.32, 123/435

See application file for complete search history.

(56) References Cited

U.S. PATENT DOCUMENTS

| 5,323,748 A | * | 6/1994 | Foster et al. ................... 123/435 |
| 5,509,394 A | | 4/1996 | Hitomi et al. .............. 123/559.1 |

(Continued)

FOREIGN PATENT DOCUMENTS

| EP | 1528241 A2 | 5/2005 |
| FR | 2868127 A1 | 9/2005 |

(Continued)

OTHER PUBLICATIONS

International Search Report and Written Opinion for PCT application PCT/US2011/000864, mailed Aug. 1, 2011.
(Continued)

*Primary Examiner* — Marguerite McMahon
(74) *Attorney, Agent, or Firm* — Terrance A. Meador

(57) ABSTRACT

In an air handling system of a uniflow-scavenged, two-stroke cycle opposed-piston engine, one or more engine operating state parameters are sensed, numerical values of air handling parameters based on trapped conditions in a cylinder of the engine at the last port closing of an engine operating cycle are determined in response to the sensed parameters, the numerical values are evaluated, and one or more of the numerical values is adjusted in response to the evaluation. The adjusted numerical values are used to control charge air flow and EGR flow in the air handling system.

10 Claims, 5 Drawing Sheets

(51) Int. Cl.
*F02B 75/28* (2006.01)
*F02D 41/14* (2006.01)

(56) References Cited

U.S. PATENT DOCUMENTS

| | | | |
|---|---|---|---|
| 6,742,335 B2 | 6/2004 | Beck et al. | 60/605.2 |
| 6,925,971 B1 | 8/2005 | Peng et al. | 123/46 R |
| 6,948,475 B1 | 9/2005 | Wong et al. | 123/299 |
| 7,128,063 B2 | 10/2006 | Kang | |
| 7,281,531 B1 | 10/2007 | Fulton et al. | 123/568.17 |
| 7,565,892 B1 | 7/2009 | Cleary et al. | |
| 8,109,258 B2 | 2/2012 | Allain et al. | 123/568.16 |
| 8,549,854 B2* | 10/2013 | Dion et al. | 60/605.2 |
| 2002/0195086 A1* | 12/2002 | Beck et al. | 123/435 |
| 2003/0230276 A1 | 12/2003 | Kataoka et al. | |
| 2005/0096833 A1 | 5/2005 | Nakazawa | |
| 2006/0016438 A1* | 1/2006 | Kang | 123/568.14 |
| 2009/0159022 A1 | 6/2009 | Chu | 123/52.2 |
| 2009/0249783 A1 | 10/2009 | Gokhale et al. | 60/602 |
| 2010/0293943 A1 | 11/2010 | Teng et al. | 60/602 |
| 2010/0293944 A1 | 11/2010 | Hunter | 60/605.2 |
| 2011/0022289 A1 | 1/2011 | Hofbauer | 701/103 |
| 2011/0289916 A1 | 12/2011 | Dion et al. | 60/605.2 |
| 2012/0125298 A1* | 5/2012 | Lemke et al. | 123/51 B |
| 2012/0210985 A1* | 8/2012 | Fuqua et al. | 123/51 B |
| 2013/0125544 A1* | 5/2013 | Mond et al. | 60/611 |
| 2013/0174545 A1* | 7/2013 | Andrasko et al. | 60/602 |
| 2013/0174548 A1 | 7/2013 | Dion | 60/605.2 |
| 2013/0333665 A1* | 12/2013 | Pursifull | 123/399 |
| 2014/0299104 A1 | 10/2014 | Quechon et al. | |
| 2014/0373814 A1 | 12/2014 | Herold et al. | |

FOREIGN PATENT DOCUMENTS

| | | | | |
|---|---|---|---|---|
| FR | 2982641 A1 | 5/2013 | | |
| WO | 2011/146111 A1 | 11/2011 | | F02B 25/08 |
| WO | WO-2011/146111 A1 | 11/2011 | | |
| WO | 2012/067643 A1 | 5/2012 | | F01B 7/14 |
| WO | WO-2012/067643 A1 | 5/2012 | | |
| WO | 2013/126347 A1 | 8/2013 | | F02B 37/04 |

OTHER PUBLICATIONS

International Search Report and Written Opinion for PCT application PCT/US2013/026737, mailed Jun. 26, 2013.
International Search Report and Written Opinion for PCT application No. PCT/US2014/042394, mailed Oct. 17, 2014.
International Search Report and Written Opinion for PCT application No. PCT/US2014/051108, mailed Nov. 24, 2014.
International Search Report and Written Opinion for PCT application No. PCT/US2014/051102, mailed Dec. 15, 2014.
Blair, G. P., Chapter 1: "Introduction to the Two-Stroke Engine"; *Design and Simulation of Two-Stroke Engines*; 1996; pp. 1-34.

\* cited by examiner

AIR HANDLING CONTROL FOR OPPOSED-PISTON ENGINES WITH UNIFLOW SCAVENGING

RELATED APPLICATIONS

This application contains subject matter related to that of the following commonly-assigned applications: U.S. application Ser. No. 13/068,679, filed May 16, 2011, published as US 2011/0289916 on Dec. 1, 2011; PCT application US2013/026737, filed Feb. 19, 2013; U.S. application Ser. No. 13/782,802, filed Mar. 1, 2013; and U.S. application Ser. No. 13/891,622, filed May 10, 2013.

BACKGROUND

The field is two-stroke cycle internal combustion engines. Particularly, the field relates to uniflow-scavenged, opposed-piston engines with air handling systems that provide pressurized charge air for combustion, and that process the products of combustion. In some aspects, such air handling systems recirculate and mix exhaust gas with the pressurized charge air in order to lower combustion temperatures.

A two-stroke cycle engine is an internal combustion engine that completes a power cycle with a single complete rotation of a crankshaft and two strokes of a piston connected to the crankshaft. One example of a two-stroke cycle engine is an opposed-piston engine in which two pistons are disposed in opposition in the bore of a cylinder for reciprocating movement in opposing directions. The cylinder has longitudinally-spaced inlet and exhaust ports that are located near respective ends of the cylinder. Each of the opposed pistons controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port and exhaust gas flows out of its exhaust port, thus gas flows through the cylinder in a single direction ("uniflow")—from intake port to exhaust port.

In FIG. 1, a uniflow-scavenged, two-stroke cycle internal combustion engine is embodied by an opposed-piston engine 49 having at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined in respective ends of a cylinder wall. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. In the example shown, the engine 49 further includes two crankshafts 71 and 72. The exhaust and intake pistons 60 and 62 are slidably disposed in the bore 52 with their end surfaces 61 and 63 opposing one another. The exhaust pistons 60 are coupled to the crankshaft 71, and the intake pistons are coupled to the crankshaft 72.

As the pistons 60 and 62 near TC, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50. The fuel mixes with charge air admitted into the bore through the intake port 56. As the air-fuel mixture is compressed between the end surfaces it reaches a temperature that causes combustion.

With further reference to FIG. 1, the engine 49 includes an air handling system 51 that manages the transport of charge air provided to, and exhaust gas produced by, the engine 49. A representative air handling system construction includes a charge air subsystem and an exhaust subsystem. In the air handling system 51, the charge air subsystem includes a charge source that receives fresh air and processes it into charge air, a charge air channel coupled to the charge air source through which charge air is transported to the at least one intake port of the engine, and at least one air cooler in the charge air channel that is coupled to receive and cool the charge air (or a mixture of gasses including charge air) before delivery to the intake port or ports of the engine. Such a cooler can comprise an air-to-liquid and/or an air-to-air device, or another cooling device. The exhaust subsystem includes an exhaust channel that transports exhaust products from exhaust ports of the engine for delivery to other exhaust components.

With further reference to FIG. 1, the air handling system 51 includes a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into an exhaust channel 124 directly from the exhaust ports 54, or from an exhaust manifold 125 that collects exhaust gasses output through the exhaust ports 54. In this regard, the turbine 121 is rotated by exhaust gas passing through it. This rotates the compressor 122, causing it to generate charge air by compressing fresh air. The charge air subsystem includes a supercharger 110. The charge air output by the compressor 122 flows through a charge air channel 126 to a cooler 127, whence it is pumped by the supercharger 110 to the intake ports. Charge air compressed by the supercharger 110 can be output through a cooler 129 to an intake manifold 130. The intake ports 56 receive charge air pumped by the supercharger 110, through the intake manifold 130. Preferably, in multi-cylinder opposed-piston engines, the intake manifold 130 is constituted of an intake plenum that communicates with the intake ports 56 of all cylinders 50.

In some aspects, the air handling system shown in FIG. 1 can be constructed to reduce NOx emissions produced by combustion by recirculating exhaust gas through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR loop external to the cylinder into the incoming stream of fresh intake air in the charge air subsystem. Preferably, the EGR loop includes an EGR channel 131. The recirculated exhaust gas flows through the EGR channel 131 under the control of a valve 138 (this valve may also be referred to as the "EGR valve").

In many two-stroke engines, combustion and EGR operation are monitored and optimized based on various measurements related to the amount of charge air delivered to the engine. For example, the ratio of the mass of charge air delivered to a cylinder to the reference mass of charge air required for stoichiometric combustion in the cylinder ("lambda") is used to control NOX emissions over a range of engine operating conditions. However, in a two-stroke cycle opposed-piston engine with uniflow scavenging, port opening times overlap for a portion of each cycle and some of the charge air delivered to a cylinder through its intake port flows out of the cylinder before the exhaust port is closed. The charge air flowing out of the exhaust port during scavenging is not available for combustion. Thus, a value of lambda based on charge air delivered ("delivered lambda") to the intake port of a cylinder in an opposed-piston engine with uniflow scavenging overstates the amount of charge air actually available for combustion.

Accordingly, there is a need to improve the accuracy of air handling control in uniflow-scavenged, opposed-piston engines.

SUMMARY

In a two-stroke cycle opposed-piston engine with uniflow scavenging, lambda is estimated or calculated based upon the charge air trapped in a cylinder by the last port to close. In this regard, the last port to close can be either the intake port or the exhaust port. Relatedly, the ratio of the mass of charge air trapped in the cylinder by the last port to close (hereinafter, "last port closing", or "LPC") to a reference mass of charge air required for stoichiometric combustion in the cylinder is referred to as "trapped lambda". Since it is the trapped charge air that is available for combustion, a trapped lambda value provides a more accurate representation of the combustion and emission potentials of the engine than a delivered lambda value.

In some aspects, combustion and EGR operation in a two-stroke cycle opposed-piston engine with uniflow scavenging are monitored and controlled based on trapped conditions at LPC during a current engine operational state.

In some aspects, control of the air handling system of a two-stroke cycle opposed-piston engine with uniflow scavenging is based on charge air trapped in a cylinder by the last port closing.

A method for controlling an air handling system of a uniflow-scavenged, two-stroke cycle opposed-piston engine includes sensing one or more engine operating state variables, determining, in response to the sensing step, numerical values of air handling parameters based on trapped conditions at LPC, evaluating the numerical values, and adjusting one or more of the numerical values in response to the evaluating step. In some aspects, the air handling parameters include trapped lambda.

In some additional aspects, the air handling parameters further include a trapped burned gas fraction, defined as the ratio of the mass of gases that are generated as a result of combustion to the total mass trapped in a cylinder following combustion, before scavenging commences.

A method for controlling an air handling system of a uniflow-scavenged, two-stroke cycle opposed-piston engine includes sensing one or more engine operating state variables, determining, in response to the sensing step, numerical values of air handling parameters based on trapped conditions in a cylinder of the engine at LPC, evaluating the numerical values, and adjusting operation of an air handling system device in response to the evaluating step. In some aspects, the air handling parameters include trapped lambda. In some other aspects, the air handling parameters further include trapped burned gas fraction.

DETAILED DESCRIPTION OF PREFERRED EMBODIMENTS

Figure 1:
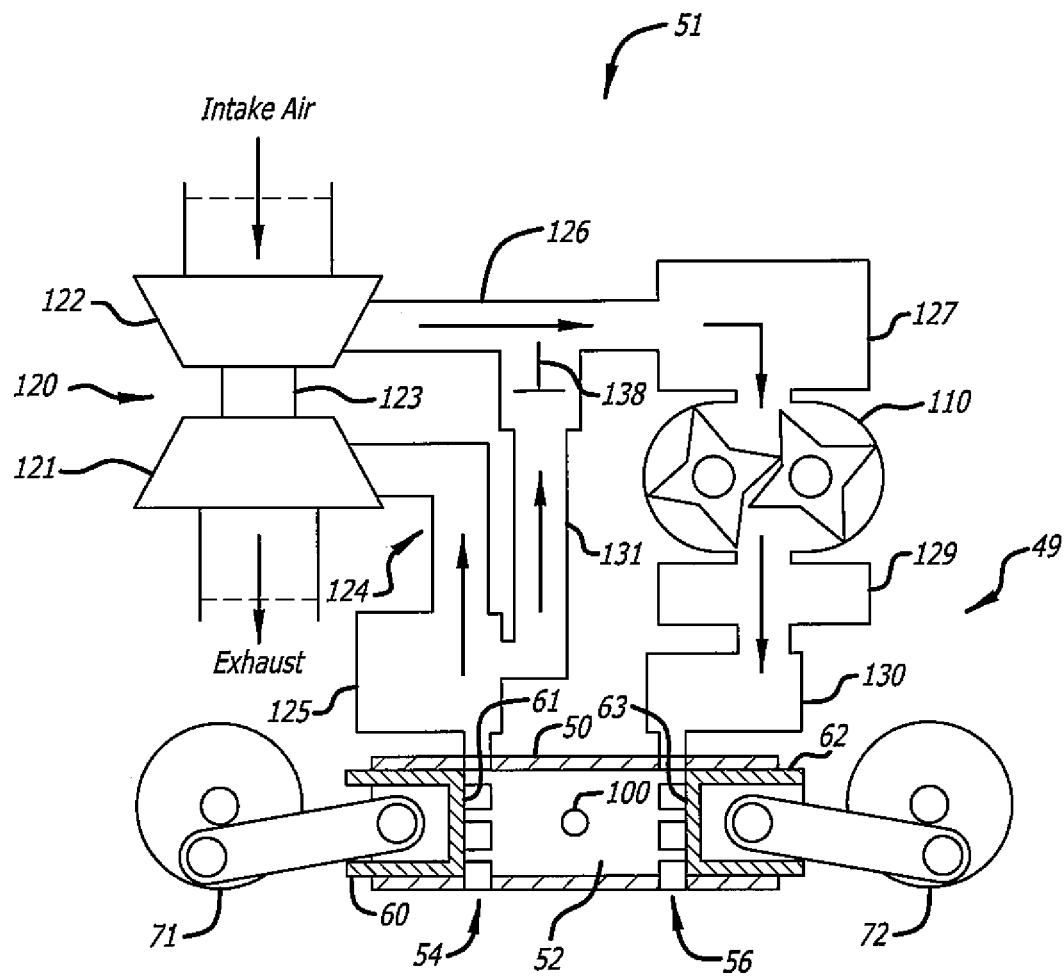
FIG. 1 is a diagram of an opposed-piston engine equipped with an air handling system with EGR and is properly labeled "Prior Art".

It is desirable to control the flow of charge air through the charge air channel of a two-stroke cycle opposed-piston engine with uniflow scavenging in order to maintain optimal control of combustion and emissions in response to variations in the operational state of the engine. Using the engine of FIG. 1 as a basis, FIG. 2 shows a control mechanization for such an opposed-piston engine, based on modifications and additions that are useful for controlling the air handling system according to this specification.

Figure 2:
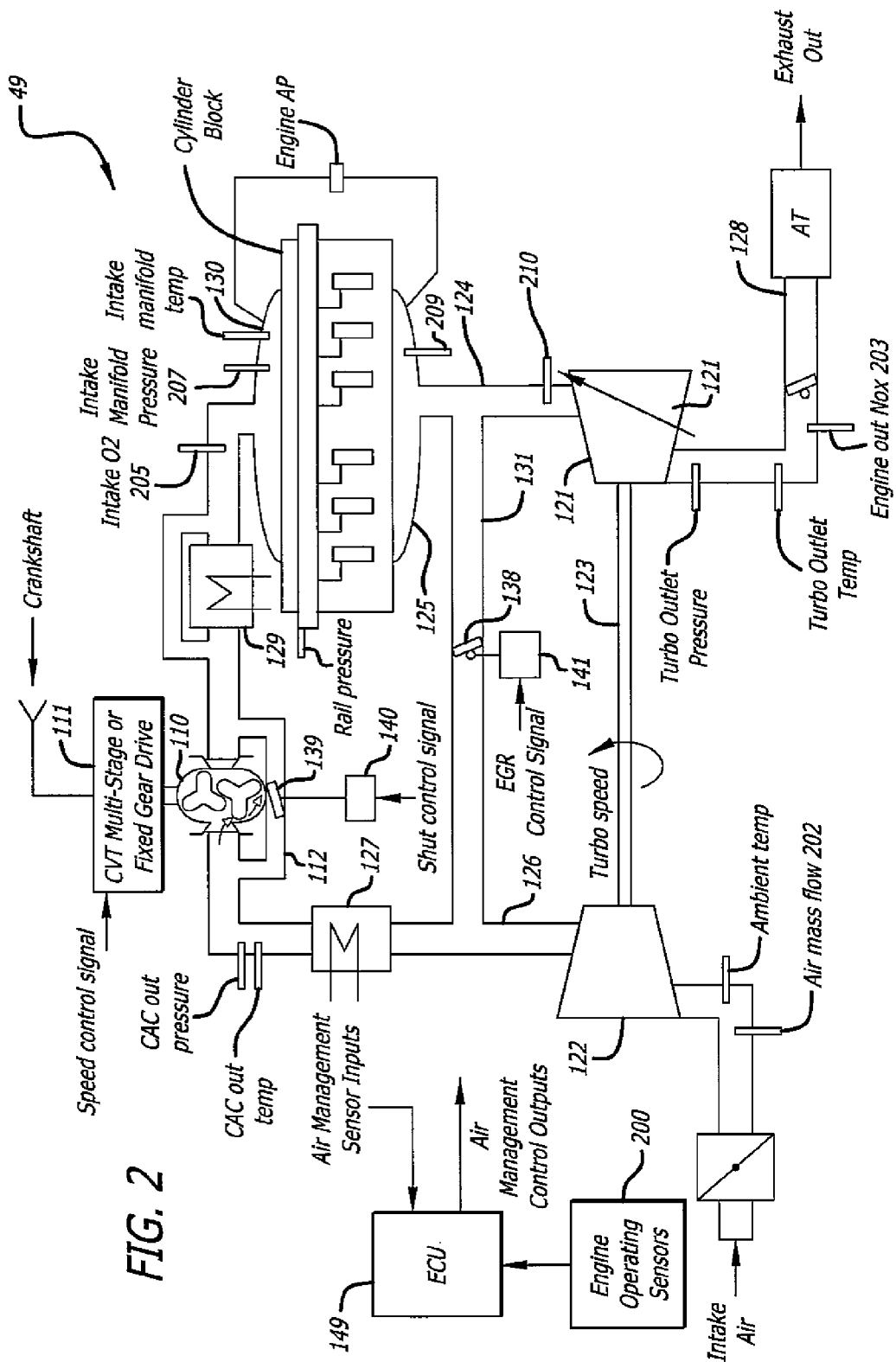
FIG. 2 is a schematic drawing illustrating a control mechanization for regulation of an air handling system in an opposed-piston engine.

An example of a specific EGR loop construction for a two-stroke cycle opposed-piston engine with uniflow scavenging is the high pressure configuration is illustrated in FIG. 2 (which is not intended to be limiting). In this regard, a high pressure EGR loop circulates exhaust gas obtained from a source upstream of the input to the turbine 121 to a mixing point downstream of the output of the compressor 122. In this EGR loop, the EGR channel 131 and the EGR valve 138 shunt a portion of the exhaust gas from the exhaust channel 124 into the charge air channel 126 where it is mixed with compressed fresh air output by the compressor 122. Operation of the valve 138 is controlled by the actuator 141 in response to an EGR control signal. If no exhaust/air mixing is required, the valve 138 is fully shut and charge air with no exhaust gas component is delivered to the cylinders. As the valve 138 is increasingly opened, an increasing amount of exhaust gas is mixed into the charge air. Conversely, from an open state, as the valve 138 is increasingly closed, a decreasing amount of exhaust gas is mixed into the charge air. This loop subjects the recirculated exhaust gas to the cooling effects of the two coolers 127 and 129. If less cooling is merited, the exhaust gas portion can be shunted around the cooler 127 to the input of the supercharger 110; this alternative subjects the exhaust gas portion to cooling by only the charge air cooler 129. A dedicated EGR cooler to cool only exhaust gas can be incorporated into the EGR channel 131, in series with the valve 138, or in series with the output port of the valve 138 and the input to the supercharger 110.

As per FIG. 2, in most aspects the supercharger 110 is coupled by a drive mechanism 111 to a crankshaft to be driven thereby. The drive mechanism 111 can comprise a stepwise transmission, or continuously variable transmission (CVT), device, in which cases, charge air flow can be varied by varying the speed of the supercharger 110 in response to a speed control signal provided to the drive mechanism. Alternatively, the drive mechanism 111 can be a fixed gear device, in which case the supercharger 110 is continuously driven at a fixed speed. In such a case, charge air flow can be varied by way of a shunt channel 112 that couples the output of the supercharger 110 to its input. Provision of a bypass valve 139 in the shunt channel 112 allows the charge air flow to be varied by modulation of charge air pressure downstream of the supercharger outlet. In some aspects, the valve 139 is operated by an actuator 140 in response to a shunt control signal.

As seen in FIG. 2, a control mechanization to operate the air handling system of a two-stroke cycle opposed-piston engine with uniflow scavenging includes an ECU 149. Preferably, the ECU 149 is constructed to control charge air flow and the amount of exhaust gas mixed with the pressurized charge air in response to specified engine operating conditions by automatically operating the valves 138 and 139 (and, possibly other valves), the supercharger 110, if a multi-speed or variable speed device is used, and the turbo-charger, if a variable-geometry device is used. Of course, operation of valves and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a state in which it is open (to some setting controlled by the ECU 149) to allow gas to flow through it, and a state in which it is closed to block gas from flowing through it.

Methods for controlling the air handling system of a two-stroke cycle opposed-piston engine with uniflow scavenging (hereinafter, "the engine") use various parameters to calculate or estimate magnitudes and ratios of elements of combustion trapped in a cylinder of the engine by the last port closing of the cylinder. In this regard, the "elements of combustion" include either or both of constituents and products of combustion. For a better understanding of these methods, we provide an explanation of a number of air handling parameters used to represent these elements, with reference to various elements of an air handling control mechanization according to FIG. 2. All of the air handling parameters in the following explanation have SI units unless specified otherwise.

Air Handling Parameters
$W_{air}$=Mass flow rate of fresh air in kg/s
$W_{egr}$=Mass flow rate of EGR gas in kg/s
$W_{sc}$=Mass flow rate of delivered charge air to a cylinder in kg/s
$W_f$=Commanded engine fuel injection rate in kg/s
$M_{res}$=Mass of residuals in cylinder in kg
$M_{tr}$=Mass of trapped cylinder gases at LPC in kg
$M_{ret}$=Mass of delivered charge air retained in cylinder in kg
$M_{del}$=Mass of charge air delivered to the cylinder in kg
$m_{O2\_air}$=Mass fraction of $O_2$ in fresh air
$m_{O2\_egr}$=Mass fraction of $O_2$ in EGR
$m_{O2\_res}$=Mass fraction of $O_2$ in cylinder residuals
$m_{O_2\_im}$=Mass fraction of $O_2$ in intake manifold
$T_{comp\_out}$=Compressor out temperature in K
$T_{egr}$=EGR temperature after cooler in K
$T_{tr}$=Temperature of trapped charge in cylinder at LPC in K
$[O_2]_{im}$=Percent volumetric concentration of $O_2$ in intake manifold
$[O_2]_{egr}$=Percent volumetric concentration of $O_2$ in exhaust gas
$[O_2]_{air}$=Percent volumetric concentration of $O_2$ in fresh air $\left(\dfrac{O_2}{F}\right)_s$ = Stoichiometric oxygen to fuel ratio $\left(\dfrac{A}{F}\right)_s$ = Stoichiometric air to fuel ratio $\gamma$=Ratio of specific heats N=Number of cylinders
$V_d$=Displacement volume per cylinder in $m^3$
$V_{tr}$=Displacement volume at LPC per cylinder in $m^3$
R=Gas constant of air J/Kg/K
$R_{o2}$=Gas constant of oxygen in J/Kg/K
$AFR_s$=Stoichiometric air fuel ratio for diesel
$AFR_g$=Global air fuel ratio (ratio of fresh air to fuel)
$P_{exh}$=exhaust gas pressure
$P_{im}$=intake manifold pressure
$P_{rail}$=fuel rail Pressure
Inj_time=Injection Timing Under steady state conditions, a charge air mass flow rate ($W_{SC}$) can be calculated as follows:

$$W_{sc}=W_{air}+W_{egr} \qquad \text{Eq.1}$$

If the engine is not equipped with EGR, then the charge air mass flow rate is as follows:

$$W_{sc}=W_{air} \qquad \text{Eq.2}$$

A number of approaches can be applied to the engine to determine charge mass flow rate, air mass flow rate and EGR mass flow rate.

Air Mass Flow Measurement/Estimation

One easily available solution to measure fresh air mass flow rate is to use a hot wire mass flow sensor 202. In this case the sensor 202 directly outputs the fresh air mass flow rate in real time. This approach, although quite simple, is relatively expensive.

Cost and complexity can be reduced by elimination of the sensor 202. Instead fresh air mass flow rate can be calculated, estimated, or inferred based on exhaust air-fuel ratio as measured by an engine out NOx (or O2) sensor 203.

$$W_{air} = \lambda_{exh} * \left(\dfrac{A}{F}\right)_s * W_f \qquad \text{Eq 3}$$

The $(A/F)_s$ is a known fuel property. The ECU 149 can assume the fuel flow rate as being a commanded fuel injection rate.

Yet another way to estimate fresh air mass flow is, as follows:

$$W_{air}=W_{sc}-W_{egr} \qquad \text{Eq4}$$

Here, the assumption is that there is a good measurement/estimation available for charge air mass flow rate (Equation 8 or Equation 10 below) and EGR mass flow rate (Equation 5 or Equation 6 below).

EGR Mass Flow Measurement/Estimation

One approach to measuring the EGR flow rate is to position a venturi in the EGR conduit 131 downstream of the valve 138, before the exhaust gas in the conduit mixes with the fresh air in the conduit 126. In this case, the EGR flow rate can be determined by pressure drop across the venturi and upstream pressure and temperature. Some calibration would be required to determine a discharge coefficient and accommodate the pressure pulsations that change with load and speed.

$$W_{EGR} = c_d * \sqrt{\dfrac{P_{comp\_out}}{R*T_{egr}}} * \sqrt{(\Delta P_{venturi} + c_1)} \qquad \text{Eq 5}$$

Another way of calculating EGR flow rate in the engine is to measure oxygen in the intake manifold 130 and exhaust gases. The engine out oxygen measurement is readily available from the NOx sensor 203. It can also be measured by installing wide band O2 sensor in the exhaust stream 128. The intake manifold oxygen can be measured in a similar way using a wide band O2 sensor 205.

The intake manifold O2 sensor 205 would have to be compensated for intake manifold pressure. Once the intake and exhaust O2 concentrations have been obtained, the mass flow rate of EGR gas can be calculated as follows:

$$W_{egr} = W_{air} \frac{T_{comp\_out}}{T_{egr}} \left( \frac{[O_2]_{im} - [O_2]_{exh}}{[O_2]_{air} - [O_2]_{im}} \right) \quad \text{Eq 6}$$

Equation 6 is based on the assumptions that the process of EGR mixing with fresh air is adiabatic and isobaric (in this case the outlet pressure of the compressor 122) and that the gas properties of EGR and fresh air are the same. The concentration of $O_2$ in air is a known quantity that varies with atmospheric pressure and relative humidity and hence can be obtained from a map as shown in Equation 7.

The EGR temperature can be assumed to be same as the temperature of exhaust gases at turbine inlet as measured by a temperature sensor 210. EGR temperature can also be obtained from a temperature sensor (not shown) that can be installed in EGR piping, before or after the EGR valve 138.

$$[O_2]_{air} = f(P_{aim}, Hum_{rel}) \quad \text{Eq 7}$$

Charge Mass Flow Rate Estimation

Once the mass flow rate of EGR gas and the mass flow rate of fresh air have been determined, the mass flow rate of charge air can be determined based on Equation 1 or Equation 2 depending on engine architecture.

Alternatively, the mass flow rate of charge air can also be determined mathematically by modeling a cylinder of the engine as an orifice based on the relationship shown in Equation 8.

$$W_{sc} = C_d A_{eff} \frac{P_{im}}{\sqrt{RT_{im}}} \sqrt{\frac{2\gamma}{\gamma - 1} \left( \left( \frac{P_{exh}}{P_{im}} \right)^{\frac{2}{\gamma}} - \left( \frac{P_{exh}}{P_{im}} \right)^{\frac{\gamma+1}{\gamma}} \right)} \quad \text{Eq 8}$$

$C_d$ (the discharge coefficient) can be calibrated for different speed and pressure ratios across the engine, using a look up table (LUT) indexed by engine speed (RPM), exhaust pressure ($P_{exh}$), and intake manifold pressure ($P_{im}$) as follows.

$$C_d = \text{LUT}(RPM, P_{exh}, P_{im}) \quad \text{Eq 9}$$

The effective orifice area ($A_{eff}$) can be computed based on the number of ports and the port timing of intake and exhaust ports.

The intake manifold pressure can be directly read from a differential intake manifold pressure sensor 207. If the sensor 207 is placed after the supercharger 110, the intake manifold pressure can be calculated by subtracting the estimated pressure drop over the charge cooler 129 from the outlet pressure of the supercharger 110.

The exhaust manifold pressure can be directly read from a pressure sensor 209 placed in exhaust manifold 125. In some cases, it might not be possible to install a pressure sensor directly in the exhaust manifold. In these cases, the readings from a turbine inlet pressure sensor 210 can be used instead of exhaust manifold pressure in Equation 8.

Another approach to estimate the charge air mass flow rate is based on a pressure ratio across the supercharger 110, supercharger speed, and supercharger efficiency.

$$W_{sc} = f(sc\_speed, PR_{sc}) \quad \text{Eq 10}$$

If the supercharger 110 is driven through a continuously variable drive 111, then the supercharger speed (sc_speed) can be measured using a speed sensor. The supercharger pressure ratio ($PR_{sc}$) can be computed by dividing intake manifold pressure by supercharger inlet pressure. The supercharger inlet pressure can be calculated by subtracting an estimated pressure drop across the charge cooler 127 from pressure measured at the compressor outlet. Alternatively, a pressure sensor 211 can be placed after the charge cooler 127 to directly report supercharger inlet pressure. In this case the compressor outlet pressure can be computed by adding estimated pressure drop across the charge cooler 127 to the supercharger inlet pressure measurement.

The pressure drop across the charge cooler 127 can be estimated from a look-up table that relates charge air flow rate to pressure drop. Alternatively, the pressure drop across the charge air cooler 127 can be directly measured using a differential pressure sensor.

Delivery Ratio Estimation

After the charge air mass flow rate is determined through any of the above-mentioned methods, the delivery ratio ($\Lambda$) can be determined. The delivery ratio definition for this invention disclosure is shown in Equation 11.

$$\Lambda = \frac{W_{sc} RT_{im} 60}{P_{im} V_d RPM} \frac{1}{N} \quad \text{Eq 11}$$

Scavenging Efficiency Estimation

Next, scavenging efficiency is calculated. For purposes of the air handling system control methods, scavenging efficiency is defined as follows.

$$\eta_{sc} = \frac{M_{ret}}{M_{tr}} \quad \text{Eq 12}$$

Scavenging efficiency can be calculated from an empirical model that relates delivery ratio and engine speed to scavenging efficiency. The empirical model can be developed from scavenging data collected from the engine during the mapping process.

$$\eta_{sc} = f(RPM, \Lambda^*) \quad \text{Eq 13}$$

With scavenging efficiency calculated, the air handling system control methods determine engine trapping efficiency, which is defined as follows.

$$\eta_{tr} = \frac{M_{ret}}{M_{del}} \quad \text{Eq 14}$$

Combining Equation 12 and Equation 14 yields $$\eta_{tr} = \eta_{sc} \frac{M_{tr}}{M_{del}} \quad \text{Eq 15}$$

A measure of the mass of gases trapped in the cylinder can be computed based on a two-zone non-isothermal model as follows.

$$M_{tr} = \frac{\rho_{del}\rho_{res}}{(\rho_{del} - \eta_{sc}(\rho_{del} - \rho_{res}))} V_{tr} \qquad \text{Eq. 16}$$

Where, $\rho_{del}$ is the density of delivered charge at last port closing and $\rho_{res}$ is the density of in-cylinder residual gases at last port closing. They can be calculated as follows:

$$\rho_{del} = \frac{P_{im}}{RT_{im}} \qquad \text{Eq. 17}$$

$$\rho_{res} = \frac{P_{im}}{RT_{res}} \qquad \text{Eq. 18a}$$

$$T_{res} = T_{exh} + \frac{(1-\eta_{tr})}{\eta_{tr}}(T_{exh} - T_{del}) \qquad \text{Eq. 18b}$$

The exhaust gas temperature can be obtained from the sensor 210. It can also be obtained directly by placing a temperature sensor in the exhaust manifold 125. Further, if a sensor is provided to measure in-cylinder pressure, then the in-cylinder pressure measured at last-port closure ($P_{LPC}$) can be substituted for $P_{im}$ in Equation 17 and Equation 18a.

The delivered air mass to one cylinder in each cycle can be computed from charge mass flow rate and engine speed as follows.

$$M_{del} = \frac{W_{sc}60}{RPM} \frac{1}{N} \qquad \text{Eq 19}$$

By substituting the values of $M_{tr}$ and $M_{del}$ in Eq 15, trapping efficiency can be calculated as shown in Equation 17

$$\eta_{tr} = \eta_{sc} N \frac{\rho_{del}\rho_{res}V_d}{(\rho_{del} - \eta_{sc}(\rho_{del} - \rho_{res}))} \frac{RPM}{W_{sc}60} \qquad \text{Eq 20}$$

Trapped Lambda Estimation

Determination of trapped lambda begins with computation of trapped oxygen mass in the cylinder. Equation 21 gives the trapped oxygen mass in the cylinder.

$$M_{O_2\_tr} = \eta_{tr}(M_{O_2\_air} + M_{O_2\_egr}) + M_{O_2\_res} \qquad \text{Eq 21}$$

Where, $M_{O_2\_air}$ is the mass of oxygen in fresh air delivered to the cylinder (Equation 22) and can be calculated as shown below.

$$M_{O_2\_air} = \frac{[O_2]_{air} W_{air} \rho_{O_2\_air} 60}{\rho_{air} RPM} \frac{1}{N} \qquad \text{Eq 22}$$

$$\rho_{air} = \frac{P_{comp\_out}}{RT_{comp\_out}} \qquad \text{Eq 23}$$

$$\rho_{O_2\_air} = \frac{P_{comp\_out}}{R_{O_2} T_{comp\_out}} \qquad \text{Eq 24}$$

$M_{O2\_egr}$ is mass of oxygen in EGR delivered to the cylinder and can be calculated based on Equation 25.

$$M_{O_2\_egr} = \frac{[O_2]_{exh} W_{egr} \rho_{O_2\_egr} 60}{\rho_{egr} RPM} \frac{1}{N} \qquad \text{Eq 25}$$

$$\rho_{egr} = \frac{P_{exh}}{RT_{egr}} \qquad \text{Eq 26}$$

$$\rho_{O_2\_egr} = \frac{P_{egr}}{R_{O_2} T_{egr}} \qquad \text{Eq 27}$$

Using an EGR fraction $\chi$=(EGR/EGR+CHARGE AIR), the mass of oxygen in EGR delivered can also be computed based on combustion stoichiometry as follows:

$$M_{O_2\_egr} = \frac{\chi}{1+\chi}\left(M_{O_2\_air} - \frac{W_f 60}{RPM} \frac{1}{N}\left(\frac{O_2}{F}\right)_s\right) \qquad \text{Eq 28}$$

$M_{O2\_res}$ is the mass of oxygen in the residual gases left in the cylinder after the scavenging process is completed. This can be calculated based on the knowledge of scavenging efficiency, mass of trapped oxygen from previous cycle and fuel injection quantity as shown in Equation 25.

$$M_{O_2\_res} = (1-\eta_{sc})\left([M_{O_2\_tr}]_{prev\_cycle} - \frac{W_f 60}{RPM} \frac{1}{N}\left(\frac{O_2}{F}\right)_s\right) \qquad \text{Eq 29}$$

If the engine is fitted with an intake manifold oxygen sensor, then the trapped oxygen can also be calculated as shown in Equation 30.

$$M_{O_2\_tr} = \eta_{tr} M_{O_2\_im} + M_{O_2\_res} \qquad \text{Eq 30}$$

Where, $M_{O2\_sc}$ is the total delivered mass of oxygen in the intake manifold and can be computed as follows:

$$M_{O_2\_im} = \frac{[O_2]_{im} W_{sc} \rho_{O_2\_im} 60}{\rho_{im} RPM} \frac{1}{N} \qquad \text{Eq 31}$$

$$\rho_{egr} = \frac{P_{im}}{RT_{im}} \qquad \text{Eq 32}$$

$$\rho_{O_2\_egr} = \frac{P_{im}}{R_{O_2} T_{im}} \qquad \text{Eq 33}$$

Finally, the trapped lambda can be computed as in Equation 34.

$$\lambda_{tr} = \left(\frac{N}{W_f} \frac{M_{O_2\_tr} RPM}{60}\right) \Big/ \left(\frac{O_2}{F}\right)_s \qquad \text{Eq 34}$$

Trapped Burned Gas Fraction

The total mass of burned gases trapped in-cylinder will change as the scavenging and trapping efficiency of the engine varies. For this parameter burned gases are defined as gases that are generated as a result of combustion (namely $CO_2$ and $H_2O$). Thus a burned gas fraction of 1 indicates stoichiometric combustion, implying that all the oxygen in the air has been used up to convert fuel ($C_xH_y$) into $CO_2$ and $H_2O$.

With external EGR being supplied to the engine, the trapped burned gas fraction can be computed as follows:

$$BF_{tr} = \frac{M_{res}BG_{res} + \eta_{tr}M_{egr}BG_{exh}}{M_{tr}}. \quad \text{Eq 35}$$

Where, $M_{egr}$ is the mass of EGR delivered through intake ports as shown in Equation 36.

$$M_{EGR} = \frac{W_{egr}60}{RPM}\frac{1}{N} \quad \text{Eq 36}$$

The burnt gas mass fraction in exhaust gases ($BF_{exh}$) can be computed based on the combustion stoichiometry.

$$BG_{exh} = \frac{(AFR_s + 1)}{(AFR_g + 1)} \quad \text{Eq 37}$$

$AFR_s$ is a known quantity for diesel fuel. $AFR_g$ can be obtained by dividing fresh air mass flow rate by fuel flow rate.

The mass of residual gases can be determined from $\eta_{sc}$ and $M_{tr}$ as shown in Equation 38.

$$M_{res}(1-\eta_{sc})M_{tr} \quad \text{Eq 38}$$

The burned gas mass fraction in the residuals ($BF_{res}$) based on trapped lambda and trapped mass that were estimated earlier.

$$BG_{res} = 1 - AFR_s\frac{(\lambda_{tr} - 1)}{M_{tr}}M_f \quad \text{Eq 39}$$

Where, $M_f$ is the mass of fuel injected per cycle per cylinder and can be calculated as shown in Equation 40.

$$M_f = \frac{W_f 60}{RPM}\frac{1}{N} \quad \text{Eq 40}$$

Equation 41 provides an alternate method for determining trapped burned gas fraction:

$$BF_{tr} = 1 - \frac{W_f}{N}\frac{AFR_{tr} \cdot 60}{RPM \cdot M_{tr}} \quad \text{Eq 41}$$

Engine Out Emissions Estimation

Once the trapped air fuel ratio and trapped burned gas mass fraction have been estimated, an empirical model can be created to estimate the exhaust components that are emitted by the engine ("engine out emissions"). The main emissions of concern are engine out NOx and engine out Soot. They can be computed as follows:

$$[NO_x, Soot] = f(RPM, W_f, \lambda_{tr}, BF_{tr}, P_{rail}, Inj\_time, T_{tr})$$

Where, $T_{tr}$ is the temperature of trapped mass in the cylinder at the start of the cycle. It can be calculated as follows:

$$T_{tr} = \frac{P_{lpc}V_{tr}}{M_{tr}R} \quad \text{Eq 42}$$

The empirical model can either be based on multiple look-up tables or non-parameterized mathematical functions such as a neural network or Basis Function.

Figure 3:
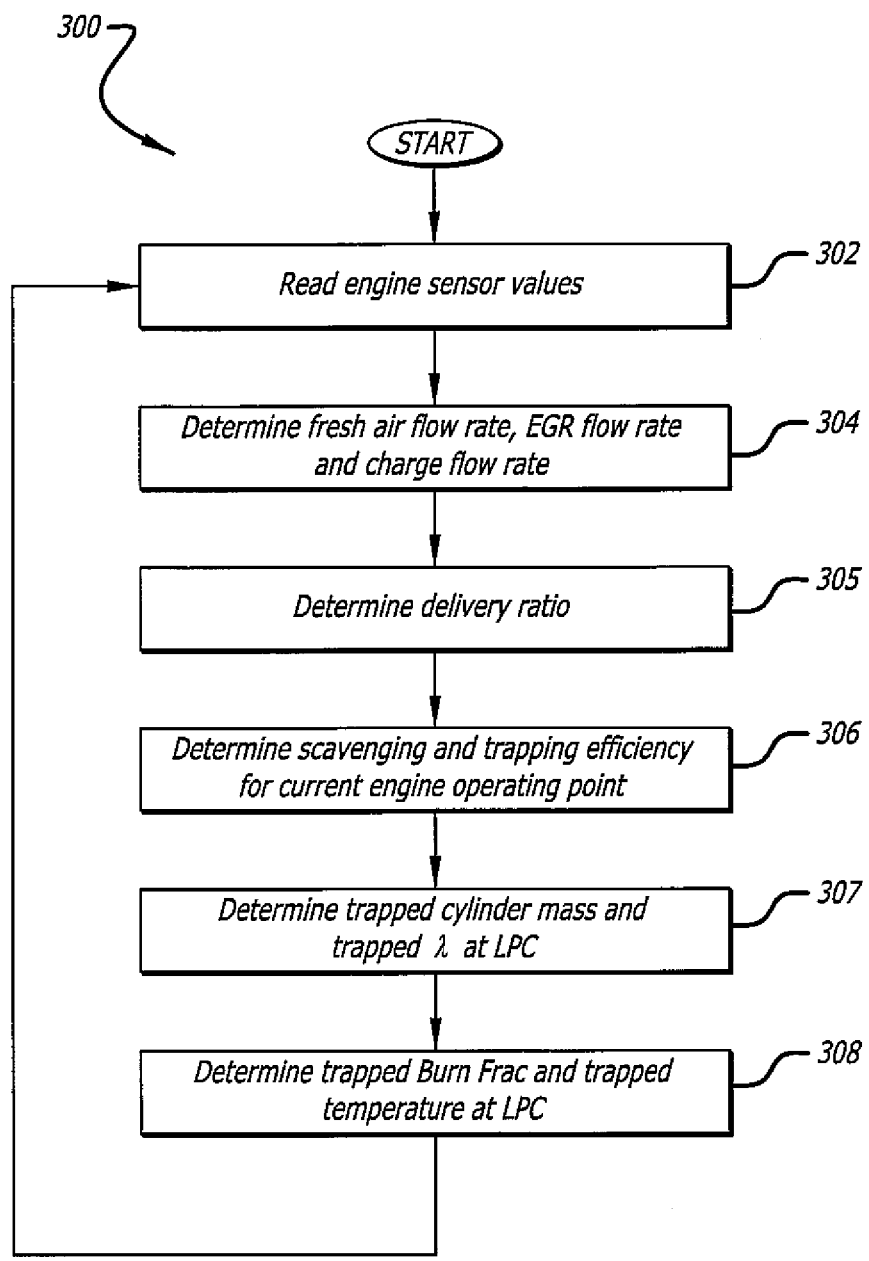
FIG. 3 is a control flow diagram showing a loop for determining numerical values of air handling control parameters during engine operation.
Figure 4:
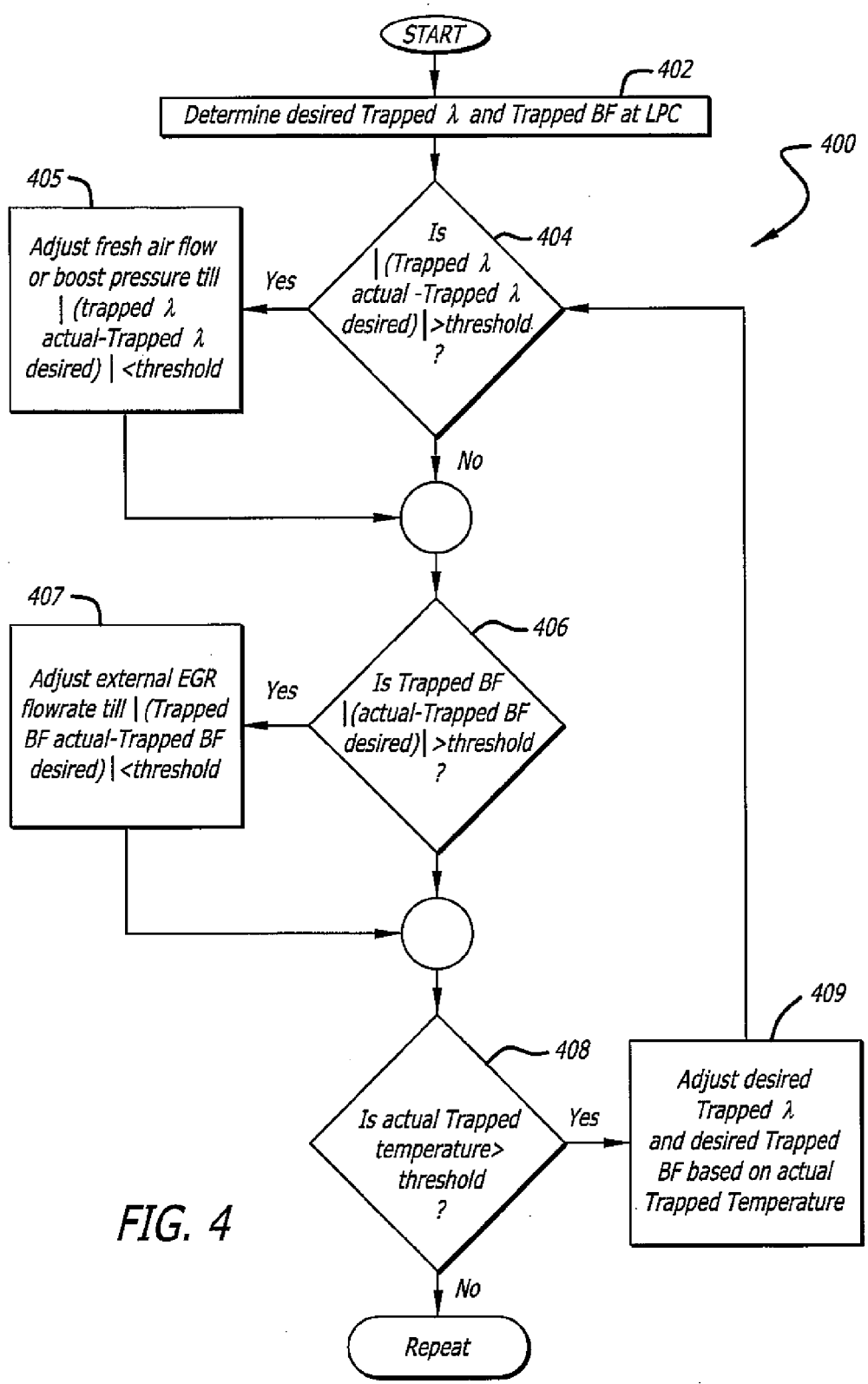
FIG. 4 is a control flow diagram showing a process for evaluating and adjusting the numerical values of the air handling control parameters.
Figure 5:
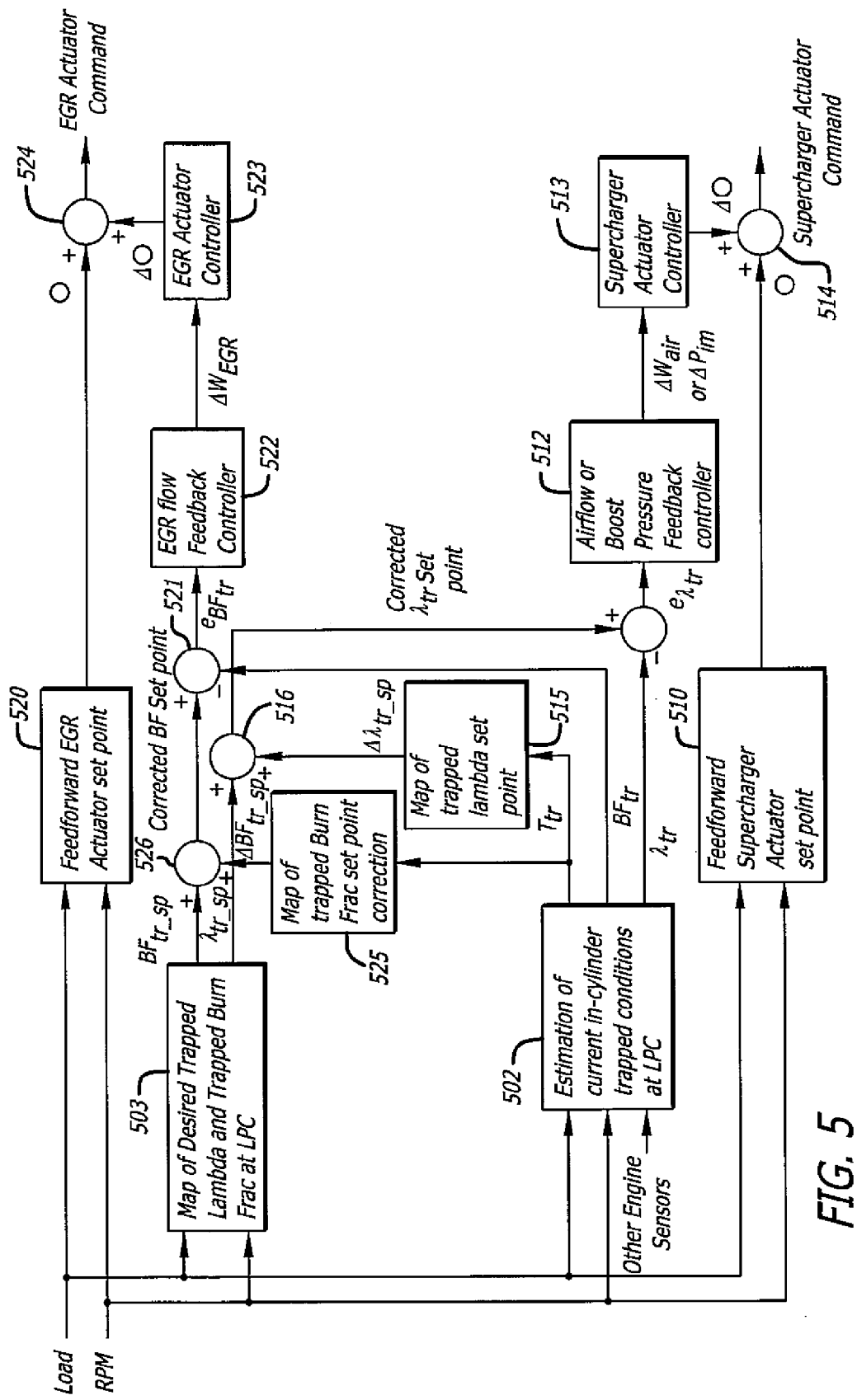
FIG. 5 is a schematic diagram showing a control mechanization that implements the evaluating and adjusting process of FIG. 4.

Air Handling Control:

Air handling control can be implemented using an air handling control mechanization based on that illustrated in FIG. 2, in which the ECU 149 can be programmed to control operations of the air handling system by methods illustrated by the diagrams of FIGS. 3-5. In this regard, FIG. 3 shows a loop for determining numerical values of air handling control parameters based on trapped conditions in a cylinder of the engine at LPC. In FIG. 4 a process for evaluating and adjusting the numerical values of the air handling control parameters is illustrated. FIG. 5 schematically illustrates a preferred control mechanization that implements the evaluating and adjusting process of FIG. 4.

With reference to FIG. 3, a loop 300 reads available engine sensors at 302 so as to determine current numerical values for air handling parameters in the current state of engine operation. Using these sensor values, the ECU 149 determines the current engine operating state in terms of torque demand (load) and RPM; and, performs a routine comprising a sequence of operations and calculations corresponding essentially to Equations 1-36. In this regard, the routine first determines fresh air, EGR and charge air flow rates in step 304, delivery ratio in step 305, and scavenging and trapping efficiencies in step 306. Then, using the parameter values determined in steps 304, 305, and 306 the routine determines parameter values representing trapped conditions in steps 307 and 308; because these values reflect the current engine operating state, the parameters associated with these parameter values are termed "actual". In step 307, actual trapped mass ($M_{tr}$) and actual trapped lambda ($\lambda_{tr}$) are calculated. In step 308, actual trapped burned gas fraction ($BF_{tr}$) and actual trapped temperature ($T_{tr}$) are calculated.

Actual trapped parameter values determined in steps 307 and 308 of the loop 300 are fed into a desired trapped cylinder condition routine 400 illustrated in FIG. 4; in some aspects, the desired trapped cylinder condition routine is executed by the ECU 149. This routine determines a desired trapped lambda at LPC and a desired trapped burned gas fraction at LPC based on look up tables (maps) that are indexed by load (engine torque) and RPM. The desired parameter values stored in the tables meet desired performance and emission goals for engine operating conditions represented by engine torque and RPM. These maps can be pre-filled with empirical data based on engine dynamometer testing and stored in or with the ECU 149.

As per FIG. 4, the desired trapped cylinder condition routine 400 accesses a map to determine desired trapped lambda and trapped burned gas fraction values for the current engine operating state at step 402 and then, in step 404, evaluates the actual trapped lambda numerical value by comparing it with the desired trapped lambda numerical value. Preferably the comparing process includes subtracting the desired trapped value from the actual trapped value. If the absolute value of this difference is greater than a threshold, the desired trapped cylinder condition routine 400, in step 405, adjusts either (or both) of the fresh air flow and intake manifold pressure to place this difference within an acceptable limit. With reference to FIG. 2, this result can be achieved by controlling the supercharger drive 111, presuming a variable speed transmission. Changing the speed of the supercharger 110 can adjust fresh airflow or intake manifold pressure. Alternatively, if the supercharger drive 111 is a fixed drive device, then the same results can be achieved by varying the setting of the bypass valve 139 via the bypass valve actuator 140 so as to shunt the supercharger's output to its input.

An exemplary control mechanization with which actual trapped lambda can be controlled is shown in FIG. 5. This control mechanization includes a trapped lambda controller comprising a feed forward controller 510 and a feedback controller 512. The trapped lambda feed forward controller 510 outputs a supercharger actuator set point $\Theta$ based on a map that is indexed by engine load and speed. This map is pre-filled with empirical data based on engine dynamometer testing and stored in or with the ECU 149. The trapped lambda feedback controller 512 receives the error ($e_{\lambda tr}$) between the desired trapped lambda and actual trapped lambda, which is calculated by the adder 511 (step 404 of FIG. 4), and converts this error into a change required in fresh air flow ($\Delta W_{air}$) or boost pressure ($\Delta P_{im}$) to minimize the error. The trapped lambda feedback controller 512 can be implemented with a PID controller, a gain scheduled PID controller, or another non-linear controller such as a sliding mode controller. A supercharger actuator controller 513 converts the required change in fresh air flow or boost pressure into either a bypass valve position or a drive ratio change, depending on the type of supercharger drive 111 being used. The supercharger actuator controller 513 that translates fresh air flow (or boost pressure) change to a supercharger drive output ($\Delta \Theta$) can be implemented as a PID controller or gain scheduled PID controller in conjunction with a supercharger model (physical or empirical) that defines the relationship between the supercharger pressure ratio, speed and mass flow rate. The supercharger output from the actuator controller 513 is added (or subtracted depending on the sign) to the output of the feed-forward controller 510 at 514. A final supercharger actuator command is then sent to the supercharger actuator through the ECU 149. Depending on the construction of the supercharger drive 111, the supercharger output command is provided either as a speed control signal to the drive 111, or as a shunt control signal to the bypass valve actuator 140.

The control of the trapped burned gas fraction is done in the same manner as trapped lambda, except that the routine varies the EGR flow rate using the EGR valve 138 to minimize the error between the actual trapped and desired trapped burned gas fraction. Thus, as per FIG. 4, in step 406, the desired trapped cylinder condition routine 400 evaluates the actual trapped burned gas fraction numerical value by comparing it with the desired trapped burned gas fraction numerical value. Preferably the comparing process includes subtracting the desired trapped value from the actual trapped value. If the absolute value of this difference is greater than a threshold, the routine 400, in step 407, adjusts the EGR flow rate to place this difference within an acceptable limit. With reference to FIG. 2, this result can be achieved by controlling the setting of the EGR valve 138 via the actuator 141.

An exemplary control mechanization with which actual trapped burned gas fraction can be controlled is shown in FIG. 5. This control mechanization includes a trapped burned gas fraction controller comprising a feed forward controller 520 and a feedback controller 522. The trapped burned gas fraction feed forward controller 520 outputs an EGR valve set point $\theta$ based on a map that is indexed by engine load and speed. This map is pre-filled with empirical data based on engine dynamometer testing and stored in or with the ECU 149. The trapped burned gas fraction feedback controller 522 receives the error ($\theta_{BFtr}$) between the desired trapped burned gas fraction and actual trapped burned gas fraction, which is calculated by the adder 521 (step 406 of FIG. 4), and converts this error into a change required in EGR flow ($\Delta W_{EGR}$) to minimize the error. The trapped burned gas fraction feedback controller 522 can be implemented with a PID controller, a gain scheduled PID controller, or another non-linear controller such as a sliding mode controller. An EGR valve actuator controller 523 converts the required change in EGR flow into an EGR valve position. The EGR actuator controller 523 that translates EGR flow change to an EGR actuator output (AO) can be implemented as a PID controller or gain scheduled PID controller in conjunction with an EGR model (physical or empirical). The EGR actuator output from the actuator controller 523 is added (or subtracted depending on the sign) to the output of the feed-forward controller 520 at 524. A final EGR valve actuator command is then sent to the EGR valve actuator through the ECU 149. The EGR valve actuator command is provided as an EGR control signal to the EGR valve actuator 141.

Referring again to FIG. 4, once the trapped lambda and trapped burned gas fraction errors have been minimized, the desired trapped cylinder condition routine 400 then compares actual trapped temperature to a predefined value in step 408. This predefined value of trapped temperature is determined based on engine dynamometer testing and is stored in or with the ECU 149. If the actual trapped temperature turns out to be greater than this predefined temperature then, at step 409, the routine 400 adjusts the desired trapped lambda and desired trapped burned gas fraction set points to minimize the impact of trapped temperature on emissions. Referring again to FIG. 5, adjustments to the desired trapped lambda and trapped burned gas fraction are made on the basis of d look-up tables 515 and 525, which are indexed by trapped temperature estimated at 502 (per Equation 42, for example). The values for these look up tables are determined by engine dynamometer testing and are stored in or with the ECU 149. At step 409, the routine 400 then readjusts the supercharger actuator output and EGR valve position to minimize the errors between the trapped and desired lambda set points (via 516 and 511 in FIG. 5) and the trapped and desired trapped burned gas fraction set points (via 526 and 521 in FIG. 5), respectively.

The loop 300 and the routine 400 described above are repeated continuously as the engine transitions from one operating point (engine load and speed) to another operating point (engine load and speed).

Although the air handling control embodiments illustrated and described herein attribute actual parameter values based on conditions in the manifolds 125 and 130 to the cylinders of the engine, it should be evident to those skilled in the art that the principles involved can be applied to the individual cylinders themselves, presuming that cost and space permit placement and operation of relevant sensors on one or more of the cylinders of a production engine. Further, the desired parameter values are obtained by empirical methods that map or synchronize those values to port closing times for a cylinder of a uniflow scavenged, two-stroke cycle opposed-piston engine running, for example, in a dynamometer.

Although the air handling embodiments illustrated and described herein have been illustrated and described with reference to a two-stroke cycle opposed-piston engine with uniflow scavenging and equipped with an EGR loop, it should be evident to those skilled in the art that certain of the parameters are useful to air handling system control in a two-stroke cycle opposed-piston engine with uniflow scavenging, but without EGR. For example, trapped lambda is a useful parameter for optimizing air handling operations in order to reduce emissions in such an engine. See Equation 2 in this regard.

Although air handling control methods have been described with reference to an opposed-engine with two crankshafts, it should be understood that these constructions can be applied to opposed-piston engines with one or more crankshafts. Moreover, various aspects of these constructions can be applied to opposed-piston engines with ported cylinders disposed in opposition, and/or on either side of one or more crankshafts. Accordingly, the protection afforded to these constructions is limited only by the following claims.

The invention claimed is:

1. A uniflow-scavenged, opposed-piston engine equipped with an air handling system, comprising:
   at feast one cylinder with a bore, axially-spaced exhaust and intake ports, and a pair of pistons disposed in opposition in the bore and operative to open and close the exhaust and intake ports during operation of the opposed-piston engine;
   a charge air channel to provide charge air to the intake port;
   an exhaust channel to receive exhaust gas from the exhaust port;
   a supercharger operable to pump charge air in the charge air channel; and,
   a control mechanization operable to determine a trapped lambda value of a mass of charge air trapped in the cylinder by the last port of the cylinder to close, in response to an engine operating state, and to adjust, based on the determined trapped lambda value, charge air flow in the charge air channel.

2. The opposed-piston engine of claim 1, in which the control mechanization is operable to adjust charge air flow based on the determined trapped lambda value by one of changing a speed of the supercharger and operating a first valve to shunt charge air flow from an output to an input of the supercharger.

3. The opposed-piston engine of claim 1, in which the engine includes an exhaust gas recirculation (EGR) loop having a loop input coupled to the exhaust channel and a loop output coupled to the charge air channel and the control mechanism is further operable to determine a trapped burned gas fraction value of a mass of combustion gases that are trapped in the cylinder trapped in the cylinder by the last port of the cylinder to close, in response to the engine operating state and to adjust, based on the determined value of the trapped burned gas fraction, EGR flow in the EGR loop.

4. The opposed-piston engine of claim 3, in which the control mechanization is operable to:
   adjust charge air flow based on the determined value of trapped lambda by one of changing a speed of the supercharger and operating a first valve to shunt charge air flow from an output to an input of the supercharger; and
   adjust EGR flow based on the determined value of trapped burned gas fraction by operating a second valve to increase or decrease exhaust gas flow through the EGR loop.

5. The opposed-piston engine of claim 4, in which the control mechanization is operable to:
   calculate an actual trapped lambda parameter value based on the current engine operating state;
   determine a desired trapped lambda parameter value for the current engine operating state;
   determine an error value based upon a difference between the actual and desired lambda parameter values; and,
   adjust charge air flow by one of changing a fresh air flow into the charge air channel or changing an intake manifold pressure in response to the error value.

6. The opposed-piston engine of claim 1, in which the control mechanization is operable to:
   calculate an actual trapped lambda parameter value based on the current engine operating state;
   determine a desired trapped lambda parameter value for the current engine operating state;
   determine an error value based upon a difference between the actual and desired lambda parameter values; and,
   adjust charge air flow by one of changing a fresh air mass flow rate into the charge air channel or changing an intake manifold pressure in response to the error value.

7. An opposed-piston engine, comprising:
   at least one cylinder with a bore, axially-spaced exhaust and intake ports, and a pair of pistons disposed in opposition in the bore and operative to open and close the exhaust and intake ports during operation of the engine;
   a charge air channel to provide charge air to the intake port;
   an exhaust channel to receive exhaust gas from the exhaust port;
   a supercharger operable to pump charge air in the charge air channel; and,
   a control mechanization operable to:
      determine a trapped lambda value of a mass of charge air trapped in the cylinder by the last port of the cylinder to close, in response to an engine operating state; and to
      adjust, based on the determined trapped lambda value, a flow of air provided to an inlet of the supercharger and a pressure of charge air pumped to the intake port.

8. The opposed-piston engine of claim 7, in which the control mechanization is operable to:
   calculate an actual trapped lambda parameter value based on the engine operating state;
   determine a desired trapped lambda parameter value for the engine operating state;
   determine an error value based upon a difference between the actual and desired lambda parameter values; and,
   adjust the speed of the supercharger in response to the error value; or
   adjust the state of a valve coupling an output of the supercharger to an input of the supercharger.

9. An opposed-piston engine, comprising:
   at least one cylinder with a bore, axially-spaced exhaust and intake ports, and a pair of pistons disposed in opposition in the bore and operative to open and close the exhaust and intake ports during operation of the engine;
   a charge air channel to provide charge air to the intake port;
   an exhaust channel to receive exhaust gas from the exhaust port;
   an exhaust gas recirculation (EGR) loop having a loop input coupled to the exhaust channel and a loop output coupled to the charge air channel;
   a supercharger operable to pump charge air in the charge air channel;
   a valve in the EGR loop operable to regulate a flow of exhaust gas to the charge air channel; and,
   a control mechanization operable to:
   determine a trapped burned gas fraction value of a mass of combustion gases that are trapped in the cylinder trapped in the cylinder by the last port of the cylinder to close, in response to an engine operating state; and to
   adjust, based on the determined trapped burned gas fraction value, a flow of exhaust gas through the EGR loop.

10. The opposed-piston engine of claim 9, in which the control mechanization is operable to:
   calculate an actual trapped burned gas fraction parameter value based on the engine operating state;
   determine a desired trapped burned gas fraction parameter value for the engine operating state;

determine an error value based upon a difference between the actual and desired lambda burned gas fraction values; and, adjust the setting of the valve in response to the error value.

* * * * *

UNITED STATES PATENT AND TRADEMARK OFFICE
CERTIFICATE OF CORRECTION

PATENT NO.        : 9,206,751 B2
APPLICATION NO.   : 13/926360
DATED             : December 8, 2015
INVENTOR(S)       : Herold et al.

It is certified that error appears in the above-identified patent and that said Letters Patent is hereby corrected as shown below:

In the claims

Column 15, claim 1, line 13, change "feast" to read "least"

Column 15, claim 3, line 41, delete second occurrence of "trapped in the cylinder"

Column 16, claim 9, lines 57 and 58, delete second occurrence of "trapped in the cylinder"

Signed and Sealed this
Twenty-ninth Day of March, 2016

Michelle K. Lee
*Director of the United States Patent and Trademark Office*